US012627097B2

(12) United States Patent
Nicholas

(10) Patent No.: US 12,627,097 B2
(45) Date of Patent: May 12, 2026

(54) ELECTRICAL EQUIPOTENTIAL CONNECTION DEVICE

(71) Applicant: LATELEC, Toulouse (FR)

(72) Inventor: Jay Nicholas, Llamtrisant (GB)

(73) Assignee: LATELEC, Toulouse (FR)

(*) Notice: Subject to any disclaimer, the term of this patent is extended or adjusted under 35 U.S.C. 154(b) by 431 days.

(21) Appl. No.: 18/247,360

(22) PCT Filed: Sep. 26, 2021

(86) PCT No.: PCT/EP2021/076425
§ 371 (c)(1),
(2) Date: Mar. 30, 2023

(87) PCT Pub. No.: WO2022/069378
PCT Pub. Date: Apr. 7, 2022

(65) Prior Publication Data

US 2024/0014595 A1 Jan. 11, 2024

(30) Foreign Application Priority Data

Oct. 1, 2020 (FR) ...................................... 2010038

(51) Int. Cl.

| | |
|---|---|
| ***H01R 13/627*** | (2006.01) |
| ***H01R 13/633*** | (2006.01) |
| ***H01R 13/74*** | (2006.01) |
| ***H01R 24/52*** | (2011.01) |
| ***H01R 103/00*** | (2006.01) |

(52) U.S. Cl.
CPC ....... *H01R 13/6271* (2013.01); *H01R 13/633* (2013.01); *H01R 13/74* (2013.01); *H01R 24/52* (2013.01); *H01R 2103/00* (2013.01)

(58) Field of Classification Search
CPC .. H01R 13/6271; H01R 13/633; H01R 13/74; H01R 24/52; H01R 2103/00; H01R 13/639; H01R 12/70; H01R 13/516
USPC .......................................................... 439/352
See application file for complete search history.

(56) References Cited

U.S. PATENT DOCUMENTS 5,769,661 A 6/1998 Nealis
6,808,407 B1 * 10/2004 Cannon ................ H01R 13/625 439/314
2008/0070448 A1 3/2008 Haller
2019/0334297 A1 * 10/2019 Kunz ..................... H01R 24/40

* cited by examiner

*Primary Examiner* — Tulsidas C Patel
*Assistant Examiner* — Jeffrey Mountain
(74) *Attorney, Agent, or Firm* — Defillo & Associates, Inc.; Evelyn A. Defillo

(57) ABSTRACT

An electrical equipotential connection device having: a connector (1) that includes: a first electrical connector element (2); at least one resilient tab (4); a socket (9) that includes: a contact surface (12); a second electrical connector element (20); at least one housing (14) suitable for cooperating with the at least one resilient tab (4); a disconnection track (17) adjacent to the housing (14) and extending substantially parallel to the insertion direction (21). The connector (1) is rotatable with respect to the base (9), about the insertion direction (21), between: a stable locking position in which the resilient tab (4) is inserted into the housing (14); an unlocking position in which the resilient tab (4) is resiliently deformed and disposed on the disconnection track (17).

6 Claims, 4 Drawing Sheets

Fig.3
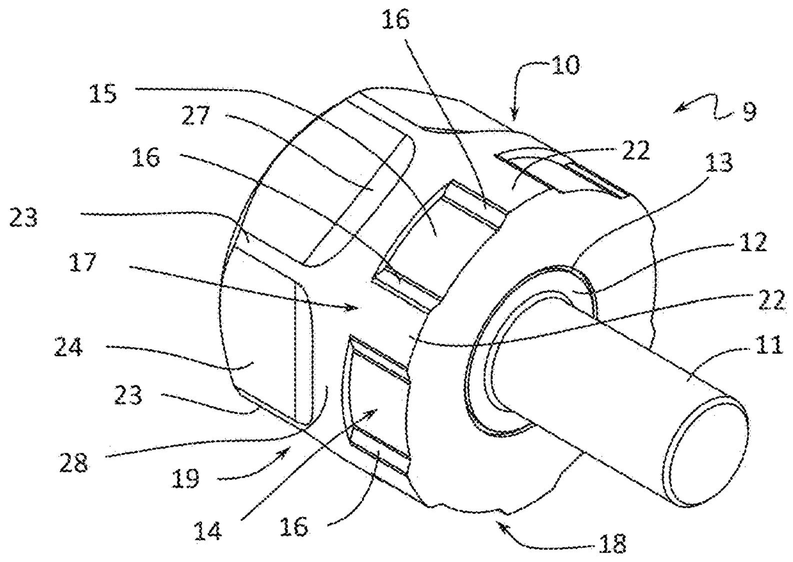
Fig.4
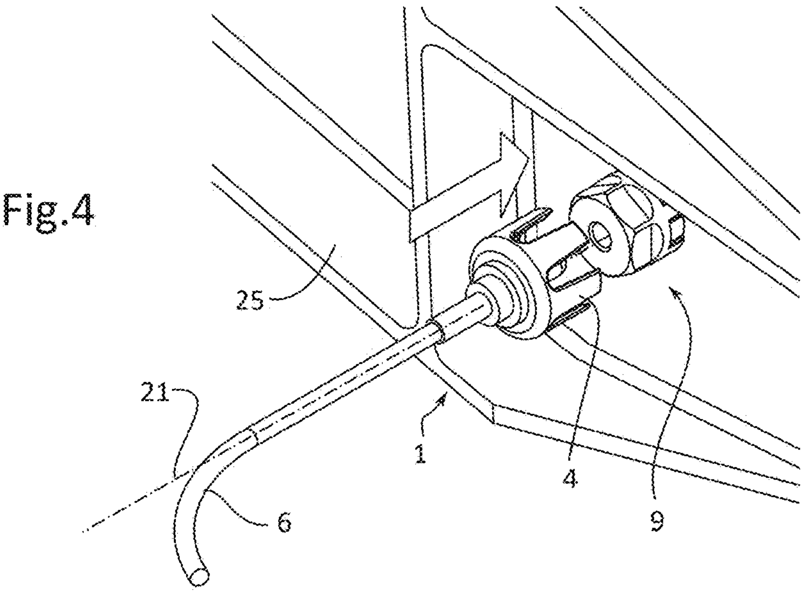
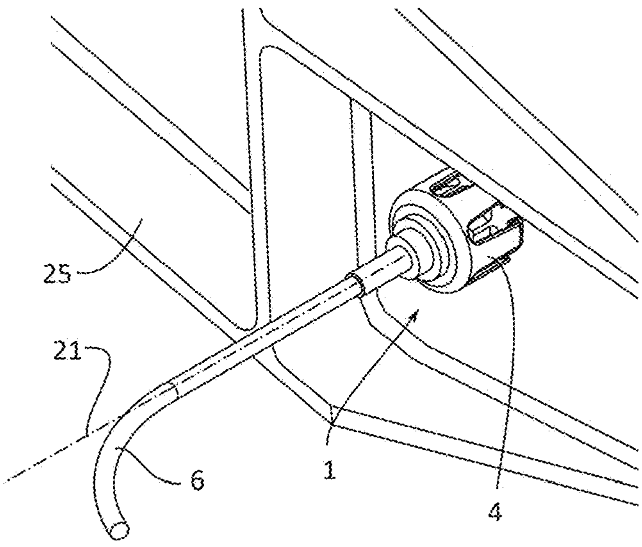
Fig.5

Fig.6
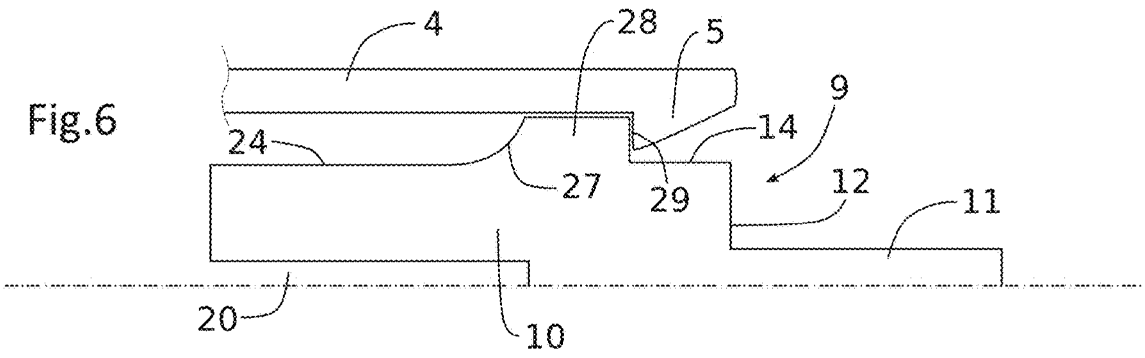
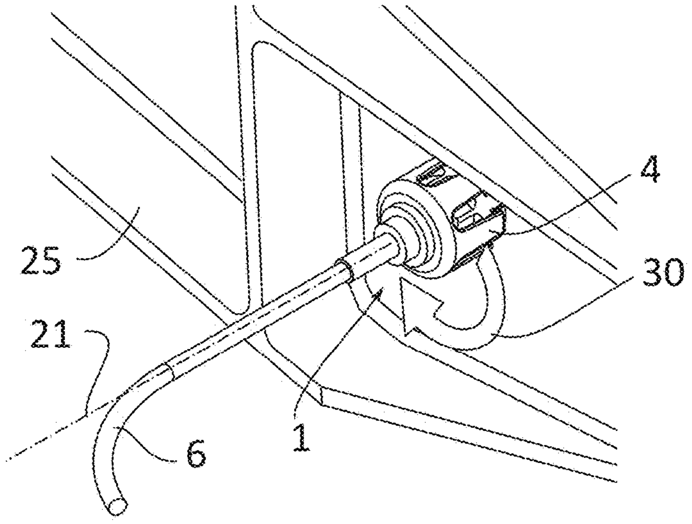
Fig.7
Fig.8
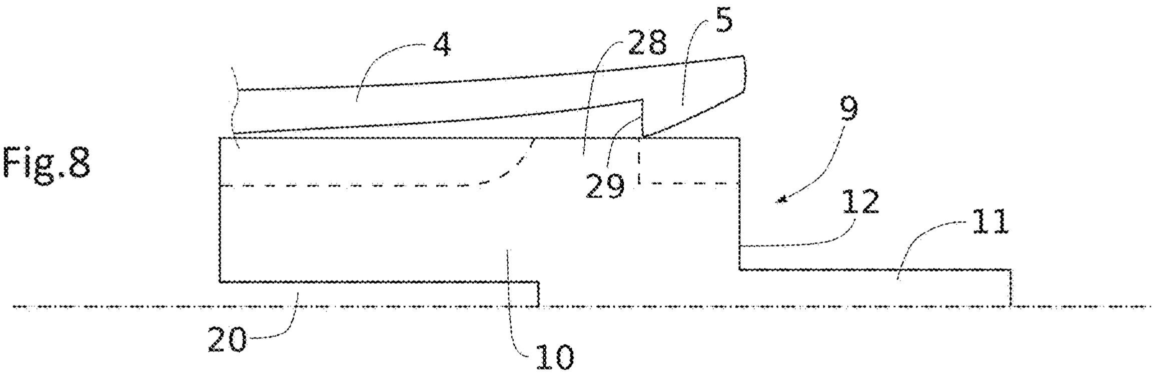

ELECTRICAL EQUIPOTENTIAL CONNECTION DEVICE

CROSS REFERENCE TO RELATED APPLICATION

This application is a national stage entry of PCT/EP2021/076425 filed Sep. 26, 2021, under the International Convention claiming priority over French Patent Application No. 2010038 filed Oct. 1, 2020.

TECHNICAL FIELD

The invention relates to the field of electrical connectors and more particularly targets devices allowing the equipotential bonding of equipment used in particular in aeronautics.

Equipotential connection devices (or "bonding devices") are devices that are common in electrical installations, and their function is to connect electrical equipment to a reference potential. This operation may also be commonly referred to as "grounding". Equipotential connection operations are essential for obtaining a safe distribution of the charges and intensities over the various metal elements of a structure.

In aeronautics, for example, the majority of the bundles of electrical cables and of the electrical equipment of an aircraft have to be electrically connected to the structure of the aircraft by such equipotential connection devices, with a high level of safety.

PRIOR ART

Equipotential bonding is generally realized during the assembly of an aircraft by an operation called "metallization" consisting of: sanding or brushing a contact surface of the structure on which the equipotential bonding has to be realized; cleaning this contact surface with a suitable grease; positioning on the contact surface a terminal as one with the equipment to be connected; screwing a fastening of the terminal; applying a protective varnish to the connection zone and allowing this varnish to dry.

These operations are relatively long and meticulous, they require specific equipment and products, and are furthermore based on manual execution which can suffer from random reproducibility.

SUMMARY OF THE INVENTION

The aim of the invention is to improve the equipotential connection devices and methods of the prior art.

To this end, the invention targets an electrical equipotential connection device having:

- a connector that comprises: a first electrical connecting element; at least one elastic tab;
- a socket that comprises: a contact surface associated with a fastening designed to mechanically and electrically connect the contact surface to a structure; a second electrical connecting element, electrically connected to the contact surface, and able to be coupled with the first electrical connecting element in an insertion direction; at least two recesses designed to cooperate with said at least one elastic tab; and a disconnection track adjacent to the recesses, situated between the two recesses, radially away from the recesses, and extending substantially parallel to the insertion direction.

The connector is also able to rotate relative to the socket, around the insertion direction, between: a stable locking position in which the elastic tab is engaged in the recess; an unlocking position in which the elastic tab is elastically deformed and is disposed on the disconnection track.

According to another subject, the invention targets a method for disconnecting a device as described above, this method involving the following steps:

- driving the connector in rotation relative to the socket from the stable locking position to the unlocking position;
- moving the connector in translation in the insertion direction, in a direction of separation of the connector relative to the socket, the at least one elastic tab traveling over the disconnection track.

Such a device allows the equipotential connection of equipment to a structure very quickly. The equipotential connection is realized by simply plugging the connector onto the socket.

By way of example, the metallization operations of the prior art require a realization time of the order of 10 to 15 minutes, by an experienced operator, for each equipotential connection, and the manufacture of an airplane requires several hundred of these equipotential connections. In this context, the electrical equipotential connection device provides a significant time saving over all of the equipotential connections, leading to a reduction in costs and in production times.

Furthermore, the device according to the invention allows an equipotential connection that is safe (the risk of anomaly in the connection is very low) and reproducible (it depends little on the person carrying out the operation), and can easily be automated.

The device according to the invention furthermore provides a connection that is more stable over time, having better dynamic resistance, in particular to vibrations.

With regard to the disconnection operations, the invention allows quick and easy disconnection while at the same time providing control safety, because the disconnection movement ensures that disconnection is indeed desired by the operator. Specifically, the operator has to demonstrate his or her intention to disconnect by moving the connector from its stable locking position to its unlocking position, along a precise angular travel; this maneuver cannot be realized by chance.

The invention also makes it possible to move some of the equipotential connection operations further upstream in the industrial supply chain. During the manufacture of an aircraft, the operations relating to the placement of the socket on the structure can be carried out jointly with the production of this structure, on a first production site. During the final assembly of the aircraft, which is generally carried out on another production site, the equipotential connection is simplified. Since operations at the end of the supply chain are generally more constrained and more expensive, this moving of certain operations further upstream thus simplifies the final assembly of an aircraft.

The device according to the invention may have the following additional features, alone or in combination:

- the first electrical connecting element is a projecting contact rod of the connector;
- the second electrical connecting element is a bore made in the socket;
- the fastening of the socket is a threaded portion;
- the connector has a plurality of said elastic tabs angularly distributed in a regular manner around the first electrical connecting element, and the socket has a head that comprises a plurality of said recesses angularly distributed in a regular manner over the head and each designed to cooperate with an elastic tab;

the socket has, in the axial direction, a first stage on which said at least one recess is situated, and a second stage having a rotation actuation imprint;

the at least one elastic tab has at its end a tooth having a stop surface, and the socket has a collar between the first stage and the second stage, the stop surface of the tooth being designed to abut against the collar so as to stop the translational movement in the insertion direction;

the rotation actuation imprint has facets and a fillet connects at least one facet to the collar;

the disconnection track extends along the first stage of the socket, being situated between two of said recesses, and along the second stage of the socket, being situated between two facets of the rotation actuation imprint;

the at least one recess has a bottom wall and two oblique lateral walls connecting the bottom wall with the disconnection track;

the first electrical connecting element and the second electrical connecting element rotate one inside the other during the rotation of the connector relative to the socket.

BRIEF DESCRIPTION OF THE DRAWINGS

Other features and advantages of the invention will become apparent from the following non-limiting description, with reference to the appended drawings, in which:

FIG. 3 is another perspective view of the socket in FIG. 2;

FIG. 4 illustrates a first operation of equipotential connection with the connector and the socket in FIGS. 1 to 3;

FIG. 5 illustrates a second equipotential connection operation;

FIG. 6 is a half-view in cross section of the elements in FIG. 5;

FIG. 7 illustrates a first operation of disconnection with the connector and the socket in FIGS. 1 to 3;

FIG. 8 is a half-view in cross section of the elements in FIG. 7; and

DETAILED DESCRIPTION

Figure 1:
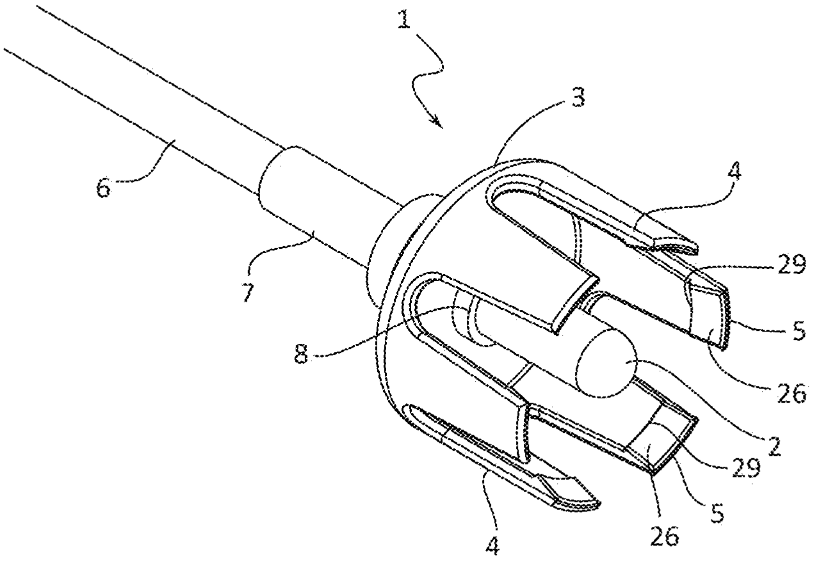
FIG. 1 is a perspective view of the connector of an equipotential connection device according to the invention.
Figure 2:
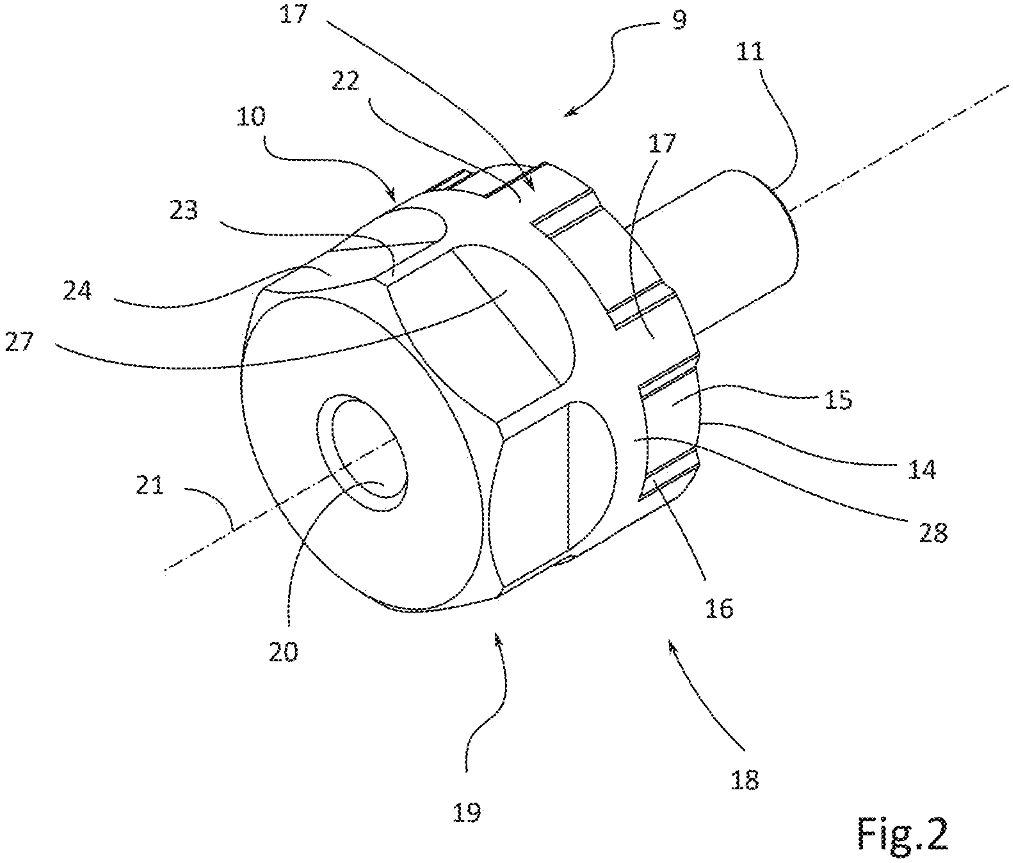
FIG. 2 is a perspective view of the socket of an equipotential connection device according to the invention.

The present example refers to an electrical equipotential connection device that has:

a connector 1 illustrated in FIG. 1;

a socket 9 illustrated in FIGS. 2 and 3.

The connector 1 illustrated in FIG. 1 comprises a first electrical connecting element that is constituted in this case of a contact rod 2 projecting from a flange 3. The contact rod 2 is made of a conductive material and is connected to the electrical conductor that it is desired to connect to the reference potential, this conductor being in this example a braided cable 6. In this example, the contact rod 2 is made of a metallic material and is extended by a crimping portion 7 that is crimped onto the braided cable 6.

The contact rod 2 preferably has, at its base, a sealing means such as an O-ring seal 8 disposed in a suitable groove.

Elastic tabs 4 project from the flange 3, substantially parallel to the contact rod 2. In this example, the elastic tabs are six in number and are angularly distributed in a regular manner all around the contact rod 2. Each elastic tab 4 has at its end a tooth 5 that is provided with an oblique surface 26 and a stop surface 29.

The elastic tabs 4 are made of a flexible material such as a polymer. A particularly economical exemplary embodiment has in this case the connector 1 made of only two pieces: the metal contact rod 2 with its crimping portion 7; and an overmolded or fitted piece, made in one piece from a polymer, which forms the flange 3, as well as the elastic tabs 4. As a variant, the connector can simply be made in one metal piece including the contact rod 2 and the elastic tabs 4.

FIGS. 2 and 3 illustrate the socket 9, which is complementary to the connector 1.

The socket 9 comprises a head 10 and a threaded portion 11. The head 10 has, at its base and around the threaded portion 11, a contact surface 12. This contact surface 12 is intended to be clamped against a metal structure by virtue of the threaded portion 11. The threaded portion 11 thus constitutes a fastening designed to mechanically and electrically connect the contact surface 12 to such a structure. The structure constitutes in this case the reference potential to which it is desired to connect the braided cable 6.

The contact surface 12 is in this case preferably surrounded by a sealing means such as an O-ring seal 13 disposed in a suitable groove of the head 10. This sealing ensures the protection of the contact surface 12 when it is clamped against the structure by the threaded portion 11.

The threaded portion 11 can be directly screwed into a suitable tapped hole made in the structure, it can also be fastened by a nut, or by any other means for clamping the contact surface 12 against another surface.

The head 10 and the threaded portion 11 are preferably made in one piece, for example by molding and/or machining conductive metallic materials.

The head 10 has a first stage 18, in this case comprising six recesses 14 that are each designed to receive the tooth 5 of an elastic tab 4 of the connector 1. Each of the recesses 14 has a bottom wall 15, as well as two lateral walls 16 extending obliquely from the bottom wall 15.

The head 10 also has, in the present example, six disconnection tracks 17. The disconnection tracks 17 are adjacent to the recesses 14. Each disconnection track 17 is in this case situated between two recesses 14. The disconnection tracks 17 are radially away from the recesses 14. In other words, the disconnection tracks 17 are radially positioned on a diameter of the head 10 that is greater than the diameter on which the bottom walls 15 of the recesses 14 are radially positioned. The lateral walls 16 are oblique walls forming a slope between each bottom wall 15 and one of the disconnections tracks 17 that is adjacent to the corresponding recess 14.

The head 10 has, in the axial direction, a second stage 19 that in this case has a hexagonal shape with six facets 24 of size allowing cooperation with a standard tool. The socket 9 can thus be actuated in rotation, in order to screw the threaded portion 11 or to stop the rotational movement thereof, using common tooling. As a variant, any other shape of the second stage 19 can be implemented so as to cooperate with other tools.

The head 10 also has a collar 28 disposed between the first stage 18 and the second stage 19, so as to form a stop wall facing the recesses 14. The collar 28 is intended to cooperate with the stop surface 29 of each tooth 5 inserted in a recess 14, so as to stop the translational movement of the connector 1 on the socket 9 and prevent disconnection.

Each facet 24 of the hexagonal imprint is connected to the collar 28 by a fillet 27 (or any other type of oblique surface).

The head 10 also has a second electrical connecting element that is in this case constituted of a bore 20 with a diameter adjusted to the contact rod 2. The bore 20 is electrically connected to the contact surface 12, and this is made possible in this case by the production of the socket 9 in one metal piece.

The contact rod 2 of the connector 1 is able to be coupled to the bore 20 in an insertion direction (illustrated by the axis 21). The contact rod 2 and the bore 20 can have simple cylindrical shapes, adjusted to allow electrical contact during the coupling of the contact rod 2 and the bore 20. As a variant, any known element promoting electrical contact in such a configuration can be used, for example elastic contacts at the contact rod 2 or inside the bore 20.

The disconnection tracks 17 extend from a zone 22 situated between each of the recesses 14, and are extended by a portion 23 positioned between the facets 24 of the hexagonal imprint of the second stage 19.

The disconnection track 17, which is formed in this case by its two sections 22, 23, thus extends over the first stage 18 and over the second stage 19 of the head 10 in a direction that is substantially parallel to the insertion direction 21.

A method for equipotential connection of a structure 25 with a conductor 6 is illustrated in FIGS. 4 and 5.

The socket 9 has been previously installed on the structure 25, during the production of the latter, for example by screwing into a tapped hole or fastening using a nut as described above. According to this assembly, the contact surface 12 of the socket 9 is mechanically and electrically in contact with the structure 25 along an interface protected by the O-ring seal 13. The structure 9 is delivered with the socket 9 mounted.

With reference to FIG. 4, the connector 1 is first positioned facing the socket 9 fastened to a structure 25. The connector 1 is positioned such that the contact rod 2 can be inserted into the bore 20 in the insertion direction 21.

The operator then inserts the connector onto the socket, while the elastic tabs 4 meet the second stage 19 of the head 10. The oblique surfaces 26 of the teeth 5 are each positioned on a facet 24 of the hexagonal imprint. This positioning is done automatically by virtue of the elastic nature of the tabs 4 that position the connector 1 in an angular position of equilibrium with one elastic tab 4 on each of the facets 24.

From this position of equilibrium, the operator continues the insertion of the connector 1 in the insertion direction 21, causing the oblique surfaces 26 of the teeth 5 to rise along the fillets 27 of the head 10, and this causes deformation of the elastic tabs 4 that then pass over the collar 28, as far as the connection position in FIG. 5.

With reference to FIG. 6, which schematically illustrates the profile of the pieces in FIG. 5 according to a half-section, after the collar 28 has been passed over, the teeth 5 are each positioned in a recess 14 and are locked in this position by the elastic tabs 4, which return to their initial position.

In the position in FIG. 5, the equipotential connection is complete. It was realized in a very simple manner while at the same time ensuring effective locking of the elastic tabs 4.

The O-ring seal 8 ensures that the contact surfaces providing electrical contact between the contact rod 2 and the bore 20 are protected from moisture and therefore from corrosion.

FIG. 6 shows the locking of the connector 1 by the positioning of the teeth 5 in the recess 14, such that the stop surface 29 of the tooth 5 is immobilized against the collar 28.

The equipotential connection, once completed, offers robustness against vibrations because any rotational or translational movement of the connector 1 is elastically brought to the stable position in FIGS. 6 and 7, by the cooperation of the teeth 5 with the lateral walls 16 or the collar 28, and against the elastic deformation of the tabs 4, which bring the teeth 5 into the recesses 14.

A method for disconnecting the described device is also described with reference to FIGS. 7 to 9.

When it is decided to disconnect the equipotential connection (during a maintenance operation, for example), an operator will first pivot the connector 1 by driving it in rotation around the insertion direction 21 (see FIG. 7).

This rotation operation is simple, but does however have to be angularly precise, and this ensures that disconnection of the equipotential connection is desired. Specifically, during this rotation, which is illustrated in FIG. 7 by an arrow 30, each tooth 5 slides over one of the lateral walls 16, causing the deformation of the corresponding tab 4 until the tooth 5 is positioned on the disconnection track 17.

FIG. 8 is a view in cross section similar to FIG. 6 illustrating the connector 1 in this angular position in which each tooth 5 is positioned on a disconnection track 17, the elastic tab 4 being elastically deformed.

The rotational movement realized by the operator must therefore be sufficiently precise to stop the teeth 5 on the disconnection tracks 17, before an excessive angular travel, which would again cause each tooth 5 to reach the next recess 14 following sliding over the next lateral wall 16.

Figure 9:
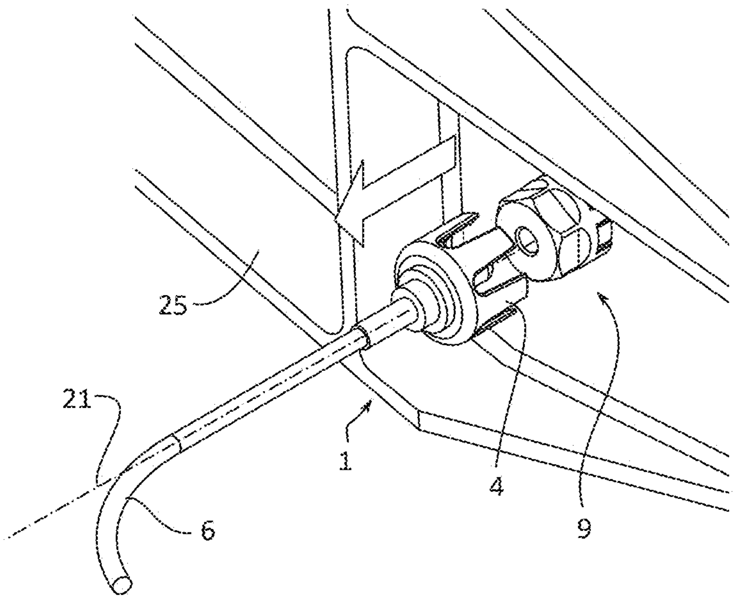
FIG. 9 illustrates a second disconnection operation.

From the position illustrated in FIG. 8, the operator pulls the connector 1 in accordance with FIG. 9. The teeth 5 then each travel over a disconnection track 17 that provides a flat surface designed for the sliding of the teeth 5 over the head 10, along the first stage 18 and the second stage 19.

Variant embodiments of the equipotential connection device and method can be envisaged. For example, the number of elastic tabs 4, of teeth 5, and of recesses 14 can be adapted, being reduced or increased to a number more appropriate for a particular application, at least one elastic tab 4 having to be present, being as one with the first electrical connecting element.

The invention claimed is:

1. An electrical equipotential connection device comprising:

a connector (1) having a first electrical connecting element (2) including a contact rod projecting from a flange (3); and at least one elastic tab (4) protruding from the flange (3), the contact rod is made of a conductive material and extends outside the connector by a crimping portion (7), the crimping portion (7) connects the contact rod to a braided cable (6), a sealing device (8) is located at a base of the contact rod (2) inside the flange (3);

a socket (9) made of a conductive metallic material, the socket (9) having: a head (10) and a threaded portion (11), the head (10) includes at a base and around the threaded portion (11) a contact surface (12) designed to mechanically and electrically connect the contact surface (12) to a structure with a reference potential, which is desired to connect the braided cable (6), the contact surface (12) is surrounded by an O-ring (13);

a second electrical connecting element (20) electrically connected to the contact surface (12), and coupled with the first electrical connecting element (2) in an insertion direction (21), the second electrical connecting element (20) includes a bore (20) for passing the contact rod to connect with the contact surface (12);

wherein the socket (9) has: at least two recesses (14) designed to cooperate with said at least one elastic tab (4); and a disconnection track (17) adjacent to the recesses (14), situated between the two recesses (14), the disconnection track (17) extends along a first stage (18) of the socket (9) and along a second stage (19) of the socket (9), being situated between two facets (24) of a rotation actuation imprint;

wherein the at least one recess (14) has a bottom wall (15) and two oblique lateral walls (16) connecting the bottom wall (15) with the disconnection track (17);

wherein the first electrical connecting element (2) and the second electrical connecting element (20) rotate one inside the other during the rotation of the connector (1) relative to the socket (9) between: a stable locking position in which the elastic tab (4) is engaged in one of the recesses (14) and an unlocking position in which the elastic tab (4) is elastically deformed and is disposed on the disconnection track (17); and wherein the electrical equipotential connection device maintains a same equipotential at all positions of the connector relative to the socket.

2. The device as claimed in claim 1, wherein the connector (1) has a plurality of said elastic tabs (4) angularly distributed in a regular manner around the first electrical connecting element (2), and the plurality of said recesses (14) are angularly distributed in a regular manner over the head (10) and the plurality of recesses (14) cooperate with an elastic tab (4).

3. The device as claimed in claim 1, wherein the at least one recess (14) has a bottom wall (15) and two oblique lateral walls (16) connecting the bottom wall (15) with the disconnection track (17).

4. An electrical equipotential connection device comprising:

a connector (1) having a first electrical connecting element (2); and at least one elastic tab (4);

a socket (9) having: a contact surface (12) associated with a fastening (11) designed to mechanically and electrically connect the contact surface (12) to a structure;

a second electrical connecting element (20) electrically connected to the contact surface (12), and coupled with the first electrical connecting element (2) in an insertion direction (21);

wherein the socket (9) has: at least two recesses (14) designed to cooperate with said at least one elastic tab (4); and a disconnection track (17) adjacent to the recesses (14), situated between the two recesses (14), radially away from the recesses (14), and extending substantially parallel to the insertion direction (21); and wherein the connector (1) rotates relative to the socket (9), around the insertion direction (21), between: a stable locking position in which the elastic tab (4) is engaged in one of the recesses (14) and an unlocking position in which the elastic tab (4) is elastically deformed and is disposed on the disconnection track (17);

wherein the socket (9) has, in the axial direction, a first stage (18) on which said at least one recess (14) is situated, and a second stage (19) having a rotation actuation imprint-;

wherein the at least one elastic tab (4) has at its end a tooth (5) having a stop surface (29), and in that the socket (9) has a collar (28) between the first stage (18) and the second stage (19), the stop surface (29) of the tooth (5) being designed to abut against the collar (28) so as to stop the translational movement in the insertion direction (21); and wherein the rotation actuation imprint has facets (24) and in that a fillet (27) connects at least one facet (24) to the collar (28).

5. The device as claimed in claim 4, wherein the disconnection track (17) extends along the first stage (18) of the socket (9), being situated between two of said recesses (14), and along the second stage (19) of the socket (9), being situated between two facets (24) of the rotation actuation imprint.

6. A method for disconnecting a device in accordance with claim 1, the method comprising the following steps:

driving the connector (1) in rotation inside the socket (9) from the stable locking position to the unlocking position;

moving the connector (1) in translation in the insertion direction, in a direction of separation of the connector (1) relative to the socket (9), the at least one elastic tab (4) traveling over the disconnection track (17).

* * * * *